United States Patent [19]

Hulme

[11] 3,927,708

[45] Dec. 23, 1975

[54] AUTOMATIC TIRE PRESSURE CONTROL

[76] Inventor: Clement E. Hulme, 9947 S. Avenue N., Chicago, Ill. 60617

[22] Filed: Jan. 28, 1974

[21] Appl. No.: 437,065

[52] U.S. Cl. .................. 152/418; 152/415; 152/419
[51] Int. Cl. ............................................. B60c 23/12
[58] Field of Search .................... 152/415, 418–422

[56] References Cited
UNITED STATES PATENTS

| | | | |
|---|---|---|---|
| 2,067,358 | 1/1937 | Thornton | 152/418 |
| 2,211,935 | 8/1940 | Parker | 152/418 |
| 2,256,469 | 9/1941 | Parker | 152/418 |
| 2,317,636 | 4/1943 | Parker | 152/418 |
| 2,408,126 | 9/1946 | Schule | 152/419 |

Primary Examiner—Drayton E. Hoffman
Attorney, Agent, or Firm—Kinzer, Plyer, Dorn & McEachran

[57] ABSTRACT

An air compressor apparatus for maintaining pressure in the tires of an automotive vehicle, the compressor being driven by wheel rotation as an incident to vehicular travel. The compressor rides in an upright position on a crank shaft which is connected to the vehicle axle for rotation therewith. Air compressed in the compressor cylinder is directed to an unloader valve settable to the desired tire pressure and effective to release compressed air to the atmosphere when the tire pressure is above a preset value. A conduit connects the unloader valve to the stem valve of the vehicle tire and has a rotary connector disposed intermediate its length to prevent twisting of the conduit as the tire rotates about the stationary compressor.

6 Claims, 3 Drawing Figures

AUTOMATIC TIRE PRESSURE CONTROL

SUMMARY OF THE INVENTION

This invention relates to a device for maintaining a pneumatic tire of an automotive vehicle at constant pressure and without periodic maintenance.

The inefficiency of an automotive vehicle due to low tire pressure is well known. This is particularly so in the instance of semi-trailers where the inside tire on dual wheel axles are difficult to reach with a tire guage. In fact the inaccessibility of the stem valve and the time involved to inflate the tire to proper pressure is as often as not a physical impediment to the maintenance of proper tire pressure. In view of such considerations as this, the common practice is for the truck driver to simply apply a hammer blow to the tire casing, relying on the resistance of the tire as a rule of thumb indication of whether it is under inflated.

An under inflated tire not only results in excessive tire wear but also, during hot weather, may result in over heated tires with consequent disintegration of the tire casing often resulting in a catastrophic occurance. Fuel consumption is increased; unnecessary delays are caused by the replacement of tires which prematurely fail and tire mileage is reduced. In brief, under inflated tires can materially reduce the performance of a semi-trailer to say nothing of increased cost to the fleet owner.

The primary object of the present invention is to eliminate lost time required for proper checking of tire pressure and to maintain tire pressure automatically as an incident to vehicle motion by so arranging and constructing an axle driven compressor that the tires are inflated on demand. More specifically it is an object of the present invention to assure constant tire pressure by providing an air compressor apparatus having a crank shaft attachable to the axle of a vehicle for rotation therewith. A compressor housing is constructed to function as a counterweight to maintain the compressor in an upright position as the crank shaft is rotated by vehicular motion. Air compressed in the cylinder is directed to an unloader valve which vents unneeded pressure to the atmsphere and allows the passage of needed pressure through a conduit to the stem valve of the vehicle tire, a rotating connector being interposed in the conduit to prevent it from twisting as the tire rotates about the stationary compressor.

DESCRIPTION OF THE PREFERRED EMBODIMENTS

Under and in accordance with the present invention, a compressor is constantly compressing air for delivery to the tire on demand during vehicle motion. If there is no demand, the compressed air is vented to the atmosphere. This is accomplished by interposing an unloader valve between the compressor means (more specifically a two-stage compressor) and the stem valve of the pneumatic tire. In order that the conduit does not become tangled, a rotary connector is interposed in the conduit between the unloader valve and the stem valve.

Figure 1:
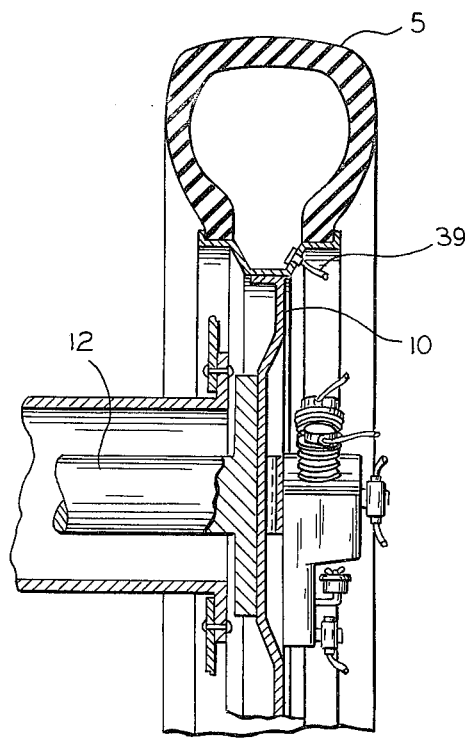
FIG. 1 is a fragmented sectional view of the vehicle axle and wheel incorporating the compressor of the present invention.

Thus referring to FIG. 1, a sectional view is shown of one of the dual wheels on the trailer of a semi-trailer. The wheel 10 shown in FIG. 1 is the outer wheel and it is to be understood that the axle 12 may have a second wheel mounted thereon as well. As will be explained hereinafter the compressor device of the present invention may be used to maintain constant pressure in the outer tire as well as the inner tire, not shown. While the present invention will be disclosed in the preferred embodiment as capable of supplying both tires, it is to be understood that the invention is equally applicable to maintaining proper tire pressure in a single tire.

Figure 2:
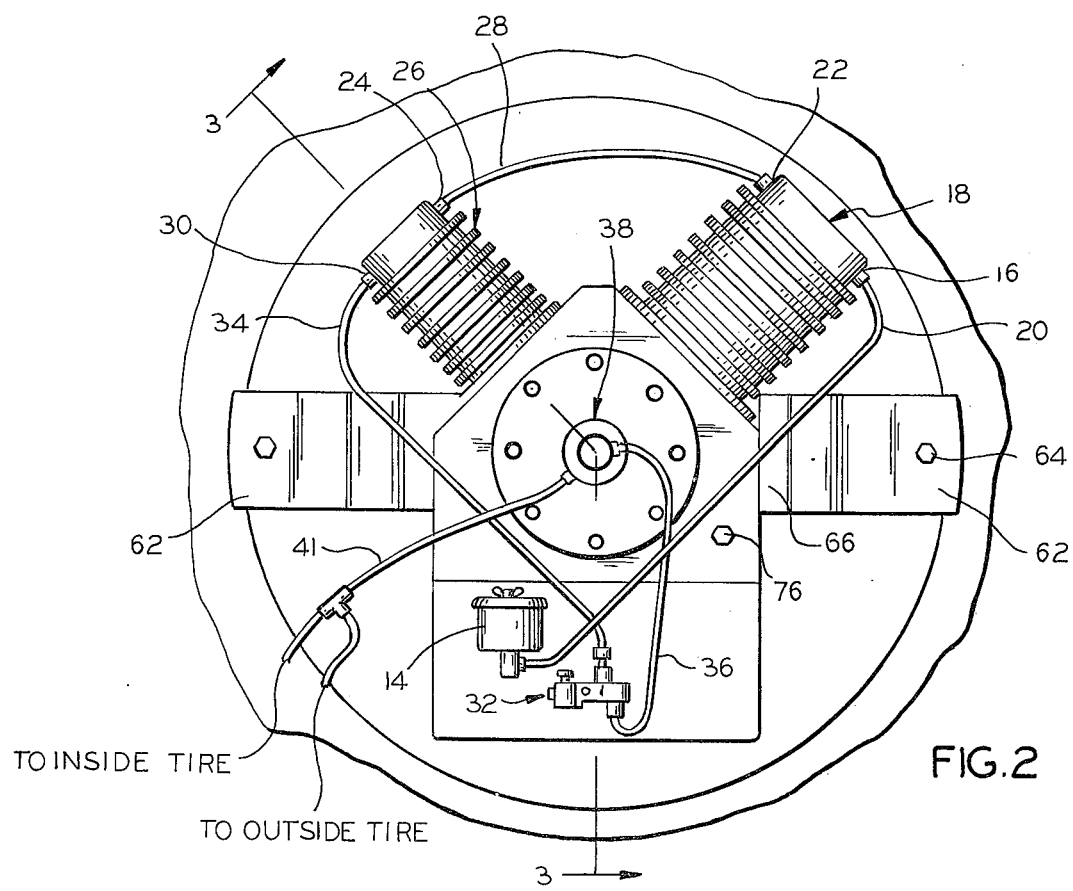
FIG. 2 is an elevation of the structure shown in FIG. 1.

Referring to FIG. 2, an air filter 14 communicates with the inlet port 16 of a primary compressor cylinder 18, supplying air thereto at atmsopheric pressure through a conduit 20. The primary cylinder outlet port 22 communicates with the inlet port 24 of the secondary compressor through a conduit 28. The air is further compressed in the secondary compressor cylinder and discharged through the outlet port 30 to an unloader valve 32 through a conduit 34. The unloader valve 32 communicates with a rotary connector 38 through a conduit 36. The connector 38, in turn, communicates directly with the stem valve 39 of the wheel 10 through a conduit 41. This connector is necessary to prevent twisting of the conduits 36 and 41 as the stem valve rotates about the nonrotating compressor.

The unloader valve 32 is commercially available in different forms, the only requirement being that it is settable to certain tire pressure and capable of venting unneeded pressure to the atmosphere.

Figure 3:
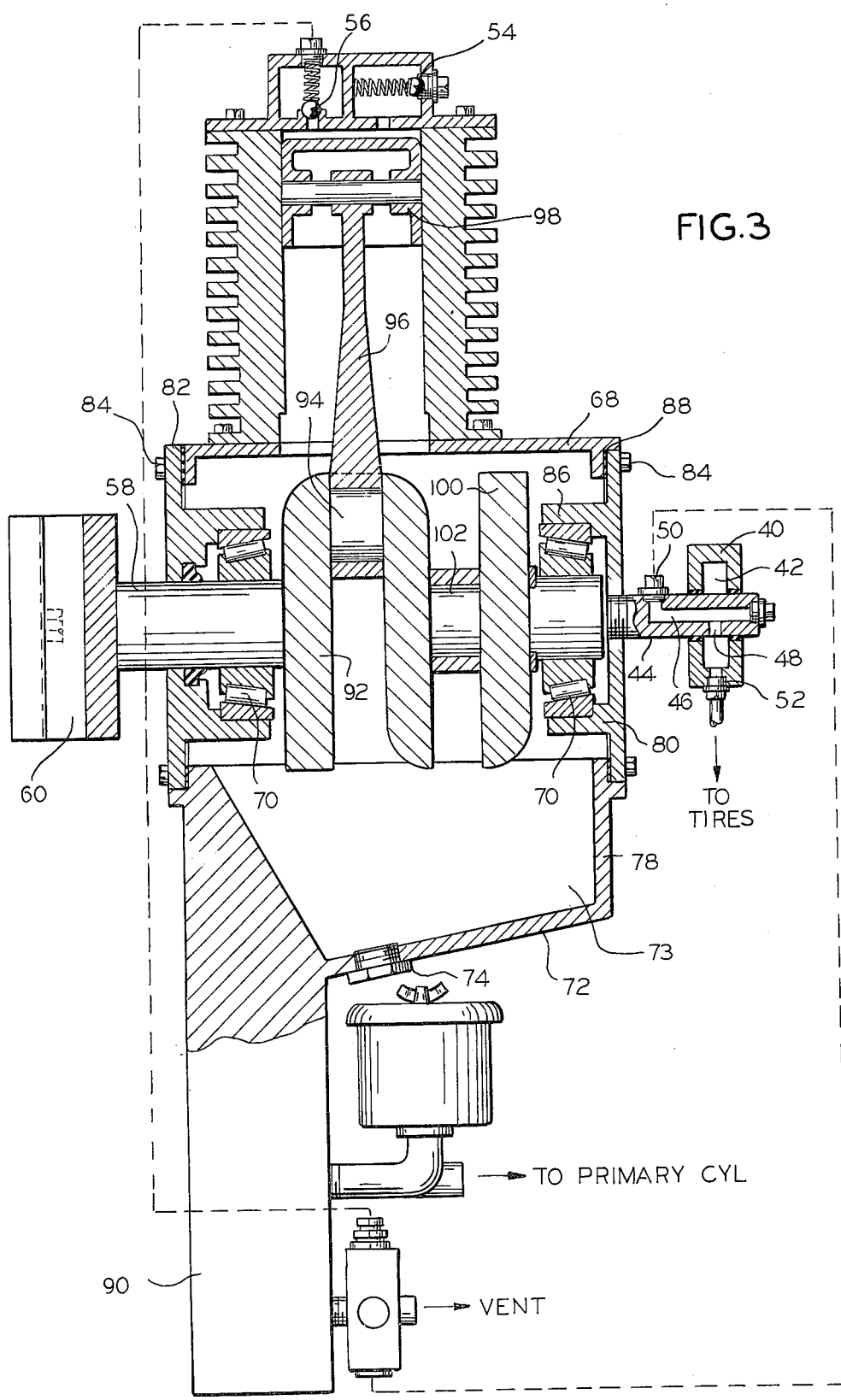
FIG. 3 is an enlarged sectional view of the compressor taken along line 3—3 of FIG. 2.

The structure of the rotary connector 38 is shown in greater detail in FIG. 3. A housing 40 affording an internal annular chamber 42 is rotatably mounted on a short cylindrical shaft 44. The chamber 42 communicates with a longitudinal passage 46 in the shaft 44 through a transverse port 48 in the shaft. The shaft is supported stationarily as hereinafter described and has a port 50 formed therein for communicating with the unloader valve through the conduit 36. A port 52 is formed in the rotating connector housing 40 for communicating directly to the stem valves of the tires through the conduit 41.

In other embodiments of the invention, the rotary connector 38 may be replaced by a simple swivel connector interposed in the conduit connecting the unloader valve to the tire stem valve.

The inlet port 24 of the secondary compressor 26 is provided with a check valve 54, FIG. 3, operable to admit partially compressed air from the primary cylinder and prevent the escape of fully compressed air from the secondary cylinder. The outlet port 30 is similarly provided with a check valve 56 operable to allow the escape of fully compressed air from the secondary cylinder to the unloader valve and to prevent the return of the fully compressed air back into the secondary cylinder. It will be understood that the primary cylinder is also equipped with two check valves, not shown, similar in function to the check valves 54 and 56, one to admit air from the filter 14 and one to deliver compressed air to the secondary cylinder.

Refering again to FIG. 3, a compressor crank shaft 58 is to be connected to a vehicle axle for rotation therewith by a mounting plate 60 which is welded or otherwise rigidly affixed to the end of the crank shaft. Because of the various structures of wheels and axles in automotive vehicles today, the mounting plate 60 of the invention must be adapted for the vehicle on which it is to operate. For example, when used on certain semi-trailers, the plate 60 may be mounted on the outer flange of the wheel bearing housing by means of two of the axle bolts. For use on a small truck or vehicle having a wheel assembly similar to a passenger automobile, the plate may be bolted directly to the wheel. In the preferred embodiment, the mounting plate 60 has flat parallel end surfaces 62, FIG. 2, with bolt holes 64 formed therein for supporting the plate as described above. A center portion 66 which connects the integral end surfaces 62 is bowed or otherwise inclinded outward away from the plane of the end surfaces 62 so that it can extend over and across existing projections on the surface to which the mounting plate is to be attached.

A housing 68, under the present invention as shown in FIG. 3, encompases the crank shaft and is rotatably supported thereon by means of bearings 70. The housing, in turn, supports the primary and secondary cylinders and serves as the stationary support for the shaft 44 of the rotary connector 38. The base 72 of the housing forms an oil sump 73 which serves to lubricate the compressors by a splash system. A drain plug 74 is inserted into the bottom of the oil sump at generally the deepest point and a similar filler plug 76, FIG. 2 is removably inserted into the front surface 78 of the housing. The filler plug 76 is disposed at the height of the desired oil level, so that a dip stick is not required to check the oil level in the sump 73. In addition, front and rear plates 80 and 82 are separably secured to the housing 68 with bolts 84 for the purpose of facilitating the assembly and accessibility of the internal operating members as described below. Each plate has an annular flange 86 for receiving the bearings 70 and an annular gasket 88 to seal against the housing.

A counterweight 90 is formed as a suspending integral part of the bottom surface of the compressor housing in the preferred embodiment. It is the counterweight which maintains the compressor in generally an upright position when the vehicle axle rotates as an incident to vehicular motion. The intake filter 14 and unloader valve 32 may be mounted on the counterweight 90 to be conveniently accessible and to contribute to the counterweight effect.

As shown in FIG. 3 the crank shaft 58 is formed with a so called throw or crank 92 having a pin 94 to which the piston rod 96 of the piston 98 of the secondary compressor is connected so as to be repeatedly reciprocated during rotation of the vehicle axle. A similar crank 100 and associated crank pin 102 are provided for the piston of the primary compressor.

Consequently, when the vehicle is in motion, the compressor pistons are constantly reciprocated. Air to be compressed is drawn into the filter 14 on the downstroke of the primary piston and fills the primary compressor cylinder when the primary piston is at bottom dead center (BDC). On the upstroke of the primary piston, the air is compressed and forced through the ports 22 and 24 and conduit 28 described above into the secondary compressor cylinder upon the downstroke of the oppositely reciprocating secondary compressor piston 98. The air is completely compressed upon the upstroke of the secondary compressor piston 98 and forced past the check valve 56 of the secondary cylinder outlet port 30 while fresh air is simultaneously again drawn into the primary compressor cylinder. Since the primary and secondary compressors are disposed at 90° angles to one another, the piston pins 94 and 102 are likewise offset from the crank shaft 58 90° relative to one another. The cylinder of the primary compressor 18 is necessarily larger than the cylinder of the secondary compressor 26 and is of ample proportions to furnish the air utilized by the secondary compressor 26.

Whereas the preferred form of the invention has been shown and described herein, it should be realized that there may be many modifications, alterations and substitutions thereto.

I claim:

1. Air compressor apparatus for maintaining pressure in the tire of an automotive vehicle and comprising:
    a crankshaft to be connected to the vehicle axle to rotate therewith;
    air compressor cylinder means having a piston connected to said crankshaft, said cylinder means comprising primary and secondary cylinders, a filter for supplying atmospheric air to the primary cylinder, and a first conduit between the output of the primary cylinder and the input of the secondary cylinder;
    a housing encompassing said crankshaft and having bearing means for rotatably supporting said crank shaft;
    an unloader valve settable to the desired tire pressure and effective to release compressed air to the atmosphere when the tire pressure is above a preset value;
    a second conduit connecting the output of the secondary cylinder to the unloader valve to supply air under pressure to the unloader valve;
    a third conduit for connecting the unloader valve to the stem valve of a tire to be inflated; and
    a rotary connector interposed in the third conduit.

2. Air compressor apparatus for maintaining pressure in the tire of an automotive vehicle and comprising:
    a crankshaft to be connected to the vehicle axle to rotate therewith, said connection comprising a plate to be rigidly affixed to the end of said crankshaft normal to the axis thereof, said plate being disengagably mountable for rotation with a vehicle wheel, with the axis of said crank shaft aligned with the axis of the vehicle axle;
    air compressor cylinder means having a piston connected to said crank shaft;
    a housing encompassing said crank shaft and having bearing means for rotatably supporting said crank shaft;
    an unloader valve settable to the desired tire pressure and effective to release compressed air to the atmosphere when the tire pressure is above a preset value;
    a conduit connecting the pressure chamber of said cylinder means to said unloader valve to supply air under pressure to the unloader valve;
    conduit means for connecting the unloader valve to the stem valve of a tire to be inflated; and
    a rotary connector interposed in said conduit means.

3. Air compressor apparatus according to claim 2 having a counterweight for maintaining the compressor in generally an upright position when the vehicle axle it is to be secured to rotates incident to vehicular motion.

4. Air compressor apparatus according to claim 2 further characterized in that said rotary connector comprises a short cylindrical shaft having an internal passage therein, an annular chamber rotatably mounted thereon, said annular chamber communicating with the passage through an opening in the shaft, and ports in the shaft and annular chamber for connection to said conduit means, the cylindrical shaft being mounted on the outer surface of said housing in line with the axis of said crank shaft.

5. Air compressor apparatus for maintaining pressure in the tire of an automotive vehicle and comprising:
   a crankshaft adapted to be ridgly mounted at the end of a vehicle axle in axial alignment with the vehicle axle for rotation therewith;
   bearing means rotatably disposed along the crankshaft;
   a housing encompassing the crankshaft and supported by the bearing means;
   an air compressor cylinder mounted on the housing having a piston reciprocative therein, and driven by said crankshaft, an inlet valve for receiving atmospheric air, and an outlet valve through which compressed air is passed from the cylinder;
   an oil sump formed in the lower portion of the housing adopted to contain fluid for lubricating the bearing means, crankshaft and piston of the compressor;
   an unloader valve settable to the desired tire pressure and effective to release compressed air to the atmosphere when the tire pressure is above a preset value;
   a first conduit connecting the outlet valve of the compressor cylinder to the unloader valve for supplying compressed air thereto;
   a second conduit connecting the unloader valve to the stem valve of a tire which is to be maintained at proper pressure;
   a rotary connector interposed in said second conduit to prevent twisting of said conduit as the vehicle wheel rotates; and
   a counterweight for maintaining the compressor in a generally upright position when the crank shaft and vehicle axle rotate incident to vehicular motion.

6. Air compressor apparatus according to claim 5, further characterized in that said rotary connector comprises a short cylindrical shaft having an internal passage therein, an annular chamber rotatably mounted thereon and communicating with said passage through an opening in the shaft, and ports in the shaft and annular chamber for connection to the first and second conduits, the cylindrical shaft being mounted on the outer surface of the housing in axial alignment with the crank shaft.

* * * * *